United States Patent [19]

Ramsden, Jr.

[11] 3,825,676

[45] July 23, 1974

[54] SURVEILLANCE SYSTEM

[75] Inventor: Paul S. Ramsden, Jr., Hudson, N.H.

[73] Assignee: Sanders Apsociates, Inc., Nashua, N.H.

[22] Filed: July 7, 1972

[21] Appl. No.: 269,663

[52] U.S. Cl...... 178/6.8, 178/DIG. 33, 178/DIG. 38, 340/258 D

[51] Int. Cl. ........................................... H04n 7/18

[58] Field of Search. 178/DIG. 1, DIG. 33, DIG. 36, 178/DIG. 37, DIG. 38, DIG. 21; 340/258 D

[56] References Cited

UNITED STATES PATENTS

| | | | |
|---|---|---|---|
| 3,553,358 | 1/1971 | Lauer | 178/6.8 |
| 3,603,729 | 9/1971 | Sperber | 178/DIG. 33 |
| 3,610,822 | 10/1971 | Ingham et al. | 178/DIG. 33 |
| 3,707,598 | 12/1972 | Scarbrough | 178/DIG. 21 |
| 3,743,768 | 7/1973 | Copland | 178/6.8 |

*Primary Examiner*—Howard W. Britton
*Attorney, Agent, or Firm*—Louis Etlinger; William L. Hunter

[57] ABSTRACT

A surveillance system using a closed circuit television installation is described in which a single integrating circuit is used to obtain two distinct measurements of the average value of the video signal pertaining to a preselected portion of the scene being viewed. The first measurement is made during one or more successive fields and this measurement is stored. The integrating circuit is then reset to zero and a second measurement made during a like number of subsequent fields. The measurement just made is then compared with the stored measurement. Any difference in excess of a predetermined threshold is indicative of the motion of an object within the preselected portion of the scene. Continuous operation can be obtained by resetting the storage device, storing the most recent measurement, resetting the integrating circuit, making another measurement, comparing, etc.

5 Claims, 1 Drawing Figure

PATENTED JUL 23 1974 3,825,676
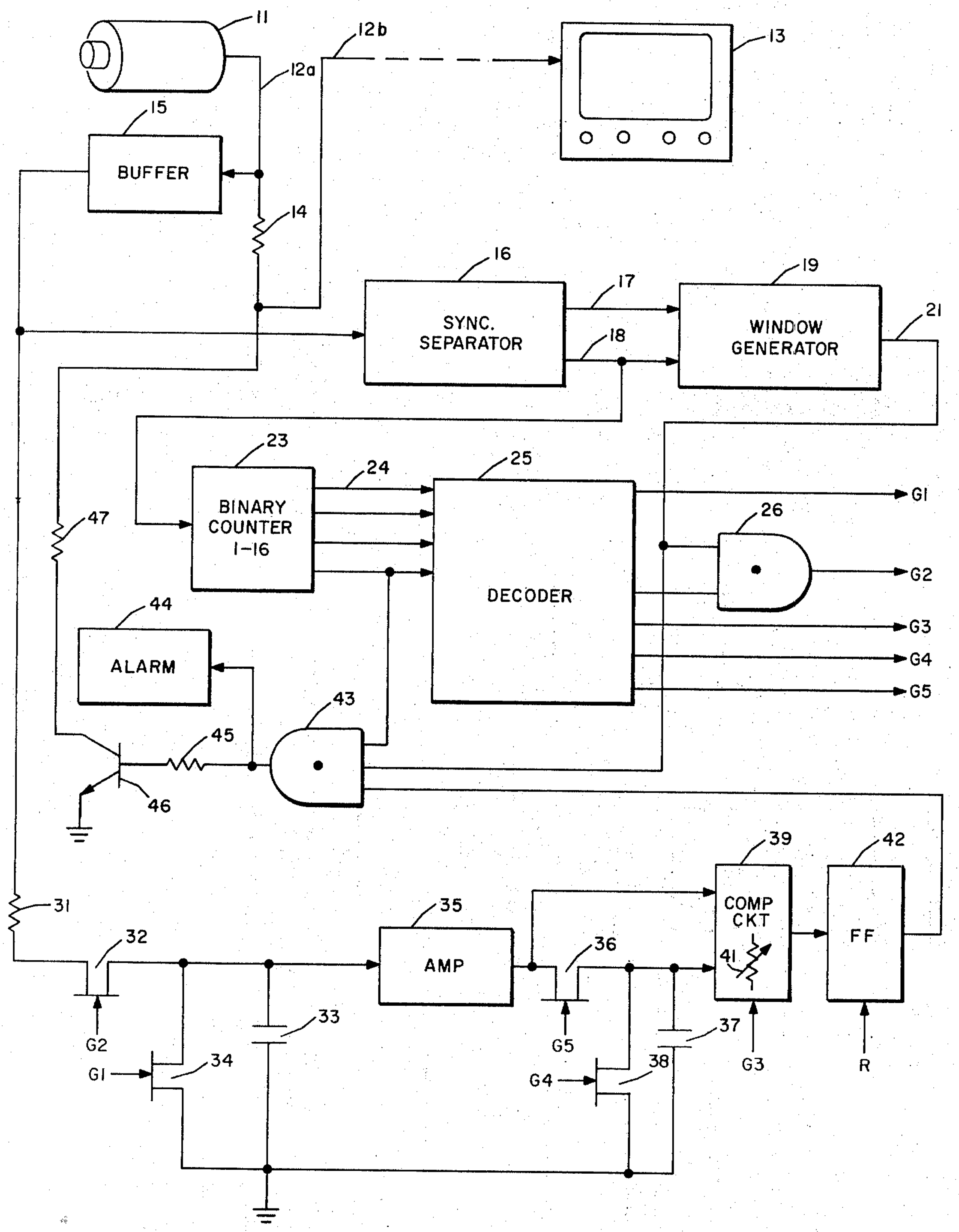

SURVEILLANCE SYSTEM

FIELD OF THE INVENTION

This invention relates generally to surveillance systems and particularly to such systems in which a television camera views a scene which includes the area to be protected and which generates a warning signal upon detecting an intrusion into the protected area.

BACKGROUND OF THE INVENTION

Various arrangements have been proposed for detecting any change in a scene viewed in a television camera. In one arrangement, the entire video signal for one frame has been stored and subsequently compared, line by line, with the video signal for a subsequent frame. The addition of any object to or removal of any object from the protected area will show up as a change in video signals on successive frames. In another arrangement, the video signal is continuously divided into two parts representing the right and left portions of the scene being viewed. As long as there is no change, the two portions remain the same and can be balanced. These portions are continuously compared so that any change in one half will upset the balance and generate a warning. A more recent system is that described in the copending U.S. patent application Ser. No. 265,105 filed June 21, 1972 by Marc Chomet and Donald E. Ellison and entitled "Surveillance System" now U.S. Pat. No. 3,781,468 granted December 25, 1973 and assigned to the same assignee as is the instant application. In the cited application, a "window" or portion of the scene being viewed, is defined. The peak magnitude of the video signal pertaining to this window and occurring during one or more successive fields is compared with the peak magnitude pertaining to this same window but occurring during a like number of subsequent fields. Any significant change in these peak magnitudes generates a warning signal.

The system described in the above cited application, although a vast improvement over known prior systems, has been found to have a number of disadvantages. For example, the apparatus in the cited application compares peak magnitudes and it has been found that not all intrusions cause a significant change in peak magnitudes. As another example, it has been found difficult to construct two peak detectors from ordinary components so as to have substantially identical operating characteristics. One reason for this is the large tolerance in values of the usual electrolytic capacitors. Attempts have been made to overcome this objection by synthesizing a signal to be compared with the output of a single peak detector. It has been found that such systems, although operative, are very difficult to adjust for proper operation.

It is a general object of the present invention to provide an improved surveillance system for detecting movement within an area to be protected.

A more specific object is to provide a surveillance system which is inexpensive, easy to adjust, and reliable.

SUMMARY OF THE INVENTION

Briefly stated, a surveillance system incorporating the present invention uses an integrating circuit so as to measure the average, rather than the peak, magnitude of each sample of the video signal. Differences between integrators is avoided by using the same integrator for all measurements. After the first measurement is made, it is stored temporarily. The single integrator is then reset to zero and another measurement made. The latter measurement is then compared with the stored measurement, any significant difference being indicative of motion in the protected area. Operation may be made continuous by resetting the storage device, storing the most recent measurement, resetting the integrator, making another measurement, and continuing the cycle.

DESCRIPTION OF PREFERRED EMBODIMENT

For a clearer understanding of the invention reference may be made to the following detailed description and the accompanying drawing the single FIGURE of which is a schematic block diagram of a preferred form of the invention.

Referring now to the drawing there is shown a television camera 11 connected by means of a communication channel, indicated generally by the reference character 12, to a television monitor 13. The communication channel 12 comprises a first portion denoted 12*a* connected to the camera 11 and a second portion denoted 12*b* connected to the monitor 13. These portions are interconnected by means of a small resistor 14 for a purpose which will appear. The value of the resistor 14 is small enough so that it has negligible effect on the normal operation of the closed circuit television system. The camera 11 is shown schematically and it is assumed to include the necessary power supplies, camera control units, etc., so as to generate not only the video signal but the necessary synchronizing and blanking signals. The camera 11 is directed to view a scene, such as a room, which includes the area to be protected. Such area may be less than the entire scene and could, for example, include a cash register or a wall safe.

The communication channel 12*a* is connected to the input of a buffer 15 which provides a low impedence source of signal without loading either the camera 11 or the monitor 13. The output of the buffer 15 is connected to a synchronizing signal separator 16 which may be of conventional construction and which separates the horizontal and vertical synchronizing pulses from the remainder of the video signal and from each other, placing these signals on conductors 17 and 18 respectively. The conductors 17 and 18 are connected to the input of a window generator 19. The purpose of this circuit is to generate a waveform indicative of the time during which any preselected rectangular portion of the scene is actually being scanned. The portion of the actual scene so defined is the area to be protected. The rectangular portion of the screen, and the signal definitive thereof, are sometimes referred to herein as the "window." This signal appears on an output conductor 21.

The details of the window generator 19 are not a part of the present invention and may be any of several constructions for example, that shown in the aforementioned copending application Ser. No. 265,105. Briefly, that application describes a window generator in which the horizontal synchronizing pulses are connected to trigger a monostable multivibrator from its stable to its unstable state whereupon it generates an output pulse the duration of which is adjustable. The trailing edge of this output pulse triggers another monostable multivibrator whose pulse width is also adjustable. This output pulse thus can be made to represent any desired portion of each horizontal line. The vertical synchronizing pulses trigger a similar pair of monostable multivibrators so that the output of the second is a signal indicative of any desired vertical portion of each field. Thus, any desired rectangular portion of the scene being viewed can be identified. Such a circuit is merely illustrative of those which might be used.

The conductor 18, carrying the vertical synchronizing pulses, is also connected to the input of a binary counter 23 of conventional construction which, in response to each vertical pulse, generates a binary output on its four output conductors 24 which are indicative, successively, of the binary numbers 0000 to 1111 in an endless series. Each of these signals thus defines the time occupied by one television field. The conductors 24 are connected to the input of a decoder 25 which may be a conventional circuit of the kind which places an output successively on 16 conductors in response to the progression of the binary number input. In the present example, only five outputs are needed and they may, for example, correspond to the duration of the first, the fourth, the seventh, the 10th, and the 13th fields counted by the counter 23. These particular fields are merely illustrative and they could, for that matter, each comprise a pulse indicative of the time for two or more successive fields. However, use of pulses defining but a single field have been found very satisfactory. The first output, corresponding to the time required for the first field, is denoted G1. The next output, assumed to be the fourth field, is connected to one input of an AND circuit 26 the other input of which is connected to the conductor 21. The output thereof is denoted G2 and represents the time during the fourth field during which the area to be protected is being scanned. The next three outputs are denoted by G3, G4, and G5, respectively. These various gates are connected to the remainder of the apparatus as indicated by these symbols.

The output of the buffer 15, which carries the video signal, is also connected through a resistor 31 and a field effect transistor 32 to one plate of a capacitor 33, the other plate of which is grounded. The capacitor 33 is shunted by another field effect transistor 34. The transistors 32 and 34 are normally nonconductive but are rendered conductive by the applications thereto of Gates G2 and G1, respectively. The ungrounded plate of the capacitor 33 is connected to the input of an amplifier 35 the purpose of which is to obtain a low impedance source of a voltage equal to the voltage of the capacitor 33, or a constant multiple thereof, without affecting the voltage of the capacitor. The output of the amplifier 35 is connected through a field effect transistor 36 to one plate of a capacitor 37 the other plate of which is grounded. This capacitor is shunted by another field effect transistor 38. The ungrounded plate of the capacitor 37 is connected to one input of a comparison circuit 39 the other input of which is taken directly from the output of the amplifier 35. The circuit 39, when enabled by application of the gate G3, compares the magnitudes of the two input signals. If the magnitudes of these signals do not differ from each other, either positively or negatively, by more than a predetermined amount, no output is generated. This predetermined amount may be adjusted by means of a controller indicated schematically at 41 and, if either input signal exceeds the other by more than this amount, an output signal is generated. Such output signal is connected to trigger a flip flop 42 so that its output goes from a zero state to a one state. The output of the flip flop 42 is connected to one input of an AND circuit 43 another input of which is the window signal on conductor 21 and a third input of which is connected to the most significant output conductor of the counter 23. The latter conductor has a zero state half the time and a one state the other half of the time, cycling at a rate of once every sixteen fields which is approximately a rate of four hertz. This cycling signal may be referred to as a blink signal. The output of the AND circuit 43 is connected to any suitable alarm device and is also connected through a resistor 45 to the base of an NPN transistor 46 the collector of which is connected through a resistor 47 to the junction of the resistor 14 with the communication channel 12*b* and the emitter of which transistor is grounded. The transistor 46 is normally nonconductive and therefore has no effect on the circuit. However, when transistor 46 is rendered conductive, as when an intrusion is detected, the resistors 14 and 47, along with the transistor 46, constitute a voltage divider which attenuates the video signal applied to the monitor 13 in accordance with the ratio of the resistors.

The operation is continuous, but, for purposes of explanation, it will be assumed to start with the generation of the gate G1. The gate G1 renders the FET (field effect transistor) 34 conductive thereby short circuiting the capacitor 33 and reducing its potential to zero. This has the effect of resetting the integrator, which comprises the series combination of the resistor 31 and capacitor 33, to zero in preparation for an integration. After passage of the gate G1, the gate G2 occurs thereby rendering the FET 32 conductive and enabling the integrating circuits. The video signal which occurs during the window and during one field is thus applied to the circuit comprising resistors 31 and capacitor 33 thereby integrating the signal for this period and obtaining a measurement of its average magnitude for this period which magnitude appears as the voltage across capacitor 33 and which is applied to the amplifier 35. The output of the amplifier 35, which as previously mentioned may be the exact value of the voltage across capacitor 33 or may be a multiple thereof, is applied as one input to the comparator 39 the other input of which is the voltage across the capacitor 37. After passage of the gate G2, the gate G3 occurs thereby enabling the circuit 39. Assuming, for the moment, that the difference in the magnitudes of the applied voltages is less than the previously mentioned predetermined amount, there is no output from the circuit 39. After passage of the gate G3, the gate G4 occurs thereby removing any charge from the capacitor 37 so as to enable it to act as a storage device for any voltage applied thereto. After passage of the gate G4, the gate G5 occurs which renders the FET 36 conductive so as to apply the output of the amplifier 35 to the capacitor 37, quickly charging it to the voltage of the amplifier 35. After passage of the gate G5, the gate G1 occurs again, thereby resetting the integrator to zero after which the gate G2 occurs and a new integration takes place during a subsequent field. The output of the amplifier 35 now represents the same multiple (which may be unity) of this new average magnitude as was stored previously on the capacitor 37. This new value, and the value stored on capacitor 37 are then compared during gate G3 as before. Assuming that their difference is less than the predetermined amount, no output appears and the entire cycle is repeated over and over again. If the difference in magnitude of the two inputs to the comparator 39 exceeds the predetermined amount, then an output appears and triggers the flip flop 42 to its opposite state. This output signal is combined with the window signal from conductor 21 and with the signal from the most significant output conductor from the counter 24 so that the output of the AND circuit 43 carries a warning signal. This warning signal can occur only if (1) there is a significant difference in magnitudes; (2) the window signal is present, and (3) there is a signal on the most significant output conductor of the counter 23. This signal is passed to any suitable alarm device 44 such as a bell or the like. It is also passed, as previously noted, through the resistor 45 to the transistor 46 so as to render this transistor periodically conductive. Assuming a rate of 60 fields per second, the transistor 46 will be rendered conductive and nonconductive cyclically at a rate of about four hertz. As a result, the video signal pertaining to the area to be protected which is applied to the monitor 13 is attenuated at the 4 hertz rate thereby causing the window to blink.

From the foregoing it will be apparent that applicant has provided an improved surveillance system. It avoids the difficulty of the peak detector by providing an integrator so as to compare average values. It avoids the difficulties encountered when one is required to make two components nearly identical because it requires but a single integrator for all measurements. It avoids the difficulties of large expense because all the components are standard, readily available inexpensive items.

Although a specific embodiment of the invention has been described for illustrative purposes, many modifications within the spirit of the invention will occur to those skilled in the art. It is therefore desired that the protection afforded by Letters Patent be limited only by the true scope of the appended claims.

What is claimed is:

1. A surveillance system including a closed circuit television arrangement having a camera viewing a scene which includes the area to be protected and having a monitor for displaying an image of the scene viewed by said camera, said system including means for separating the horizontal and vertical synchronizing signals from the video signals generated by said camera, first means responsive to said synchronizing signals for generating a window signal indicative of that portion of the time during each field that a preselected rectangular fraction thereof is being scanned, and second means responsive to said synchronizing signals and said window signal for generating a plurality of sequentially and repetitively occurring timing gates, characterized in that said system includes an integrator, an amplifier connected to the output of said integrator, as storage capacitor, and a comparator having an output and first and second inputs connected to the output of said amplifier and to said storage capacitor respectively, said comparator being for generating a signal at its output when said inputs differ by more than a preselected amount, and means controlled by said timing gates for sequentially resetting said integrator, applying the window portion of said video signal to said integrator, enabling said comparator, removing the charge from said capacitor and connecting the output of said amplifier to said storage capacitor.

2. A surveillance system in accordance with claim 1 further including an alarm circuit connected to the output of said comparator.

3. A surveillance system in accordance with claim 1 in which said gates generated by said second means responsive to said synchronizing signals comprise first, second, third, fourth and fifth successively occurring gates spaced apart by time intervals approximately equal to an integral multiple of the duration of one television field.

4. A surveillance system in accordance with claim 3 in which said means controlled by said gates includes means controlled by said first gate for resetting said integrator, means controlled by said second gate for applying said video signal to said integrator, means controlled by said third gate for enabling said comparator, means controlled by said fourth gate for removing the charge from said capacitor and means controlled by said fifth gate for connecting the output of said amplifier to said storage capacitor.

5. A surveillance system in accordance with claim 4 in which each of said first, third, fourth and fifth gates has a duration approximately equal to an integral multiple of the duration of one television field and in which said second gate represents said window signal occurring during an integral multiple of television fields.

* * * * *